United States Patent
Du Chane

(10) Patent No.: US 8,444,460 B1
(45) Date of Patent: May 21, 2013

(54) LIVESTOCK ORGAN PROCESSING APPARATUS

(75) Inventor: Thadeus Grover Du Chane, Huron, SD (US)

(73) Assignee: Dakota Provisions, Huron, SD (US)

( * ) Notice: Subject to any disclaimer, the term of this patent is extended or adjusted under 35 U.S.C. 154(b) by 0 days.

(21) Appl. No.: 13/404,164

(22) Filed: Feb. 24, 2012

(51) Int. Cl.
*A22C 25/14* (2006.01)

(52) U.S. Cl.
USPC .......................................................... 452/106

(58) Field of Classification Search
USPC .................................. 452/106, 177–183, 198
See application file for complete search history.

(56) References Cited

U.S. PATENT DOCUMENTS

| | | | | |
|---|---|---|---|---|
| 5,183,434 A * | 2/1993 | Scheier et al. | ................. | 452/131 |
| 5,207,610 A * | 5/1993 | Ogawa | ........................... | 452/110 |
| 6,361,426 B1 * | 3/2002 | Kragh | ........................... | 452/161 |
| 7,241,505 B2 * | 7/2007 | Glaubitt et al. | ................ | 428/429 |
| 7,252,584 B2 * | 8/2007 | Kragh | ........................... | 452/163 |
| 7,467,995 B2 * | 12/2008 | Ketels | ........................... | 452/162 |
| 7,794,311 B2 * | 9/2010 | Groenewegen et al. | ....... | 452/173 |
| 8,235,774 B2 * | 8/2012 | McBrayer et al. | ............. | 452/149 |

* cited by examiner

*Primary Examiner* — Richard Price, Jr.
(74) *Attorney, Agent, or Firm* — Jeffrey A. Proehl; Woods, Fuller, Shultz & Smith, P.C.

(57) ABSTRACT

An organ processing apparatus has an input and an output, and comprises an intake conveyor having a longitudinal extent extending from the input toward the output, with the intake conveyor including a plurality of cradles movable along the longitudinal extent of the conveyor. The apparatus may include a positioning wall with a guide surface located adjacent to a lateral side the intake conveyor. The apparatus may also include a cutter configured to sever a portion of an organ positioned in one of the cradles from a remainder of the organ. The apparatus may further include a peeling assembly configured to remove an outer membrane from the organ.

22 Claims, 4 Drawing Sheets

LIVESTOCK ORGAN PROCESSING APPARATUS

BACKGROUND

1. Field

The present disclosure relates to livestock processing apparatus and more particularly pertains to a new livestock organ processing apparatus for removing elements of the organ to provide a more suitable and acceptable product.

2. Description of the Prior Art

The processing of livestock carcasses, including the muscle and organs of the carcass, for food and other purposes is often handled manually using sharp cutting instruments and manual manipulation of the parts of the carcass which is dangerous work that can lead to injuries of the persons performing the work. Furthermore, the cost of the labor involved in processing some of the parts of the carcass may make the processing cost prohibitive, especially for portions of the animal that may not have a high value to the consumer. For example, processing of some organs of the carcass may be difficult and require a significant degree of relatively costly and dangerous manual labor to prepare, but may not be as commercially valuable as other parts of the carcass. However, such organs are not completely without a commercial market, and in an effort to minimize waste and maximize the value of the carcass, may be processed into a suitable product.

SUMMARY

In view of the foregoing disadvantages inherent in the processing of the organs of carcasses, the present disclosure describes a new livestock organ processing apparatus which may be utilized for removing elements of the organ to provide a more suitable and acceptable product while minimizing the cost and danger of manual processing.

In one aspect, the present disclosure relates to an organ processing apparatus having an input and an output that may comprise an intake conveyor having a longitudinal extent extending from the input toward the output, with the intake conveyor including a plurality of cradles movable along the longitudinal extent of the conveyor. The apparatus may comprise a positioning wall with a guide surface located adjacent to a lateral side the intake conveyor. The apparatus may further comprise a cutter configured to sever a portion of an organ positioned in one of the cradles from a remainder of the organ. The apparatus may further comprise a peeling assembly configured to remove an outer membrane from the organ.

In another aspect, the disclosure relates to an organ processing apparatus having an input and an output that may comprise an intake conveyor having a longitudinal extent extending from the input toward the output, with the intake conveyor including a plurality of cradles movable along the longitudinal extent of the conveyor. The cradles may have an open lateral side. The apparatus may include a positioning wall with a guide surface located adjacent to the open lateral sides of the cradles on a lateral side the intake conveyor, and an organ holding assembly configured to hold the organs in the respective interiors of the cradles and hold the organs in the cradles against the guide surface. The apparatus may also include a cutter configured to sever a portion of an organ positioned in one of the cradles from a remainder of the organ as the cradle holding the organ moves by the cutter, and a peeling assembly configured to remove an outer membrane from the organ.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
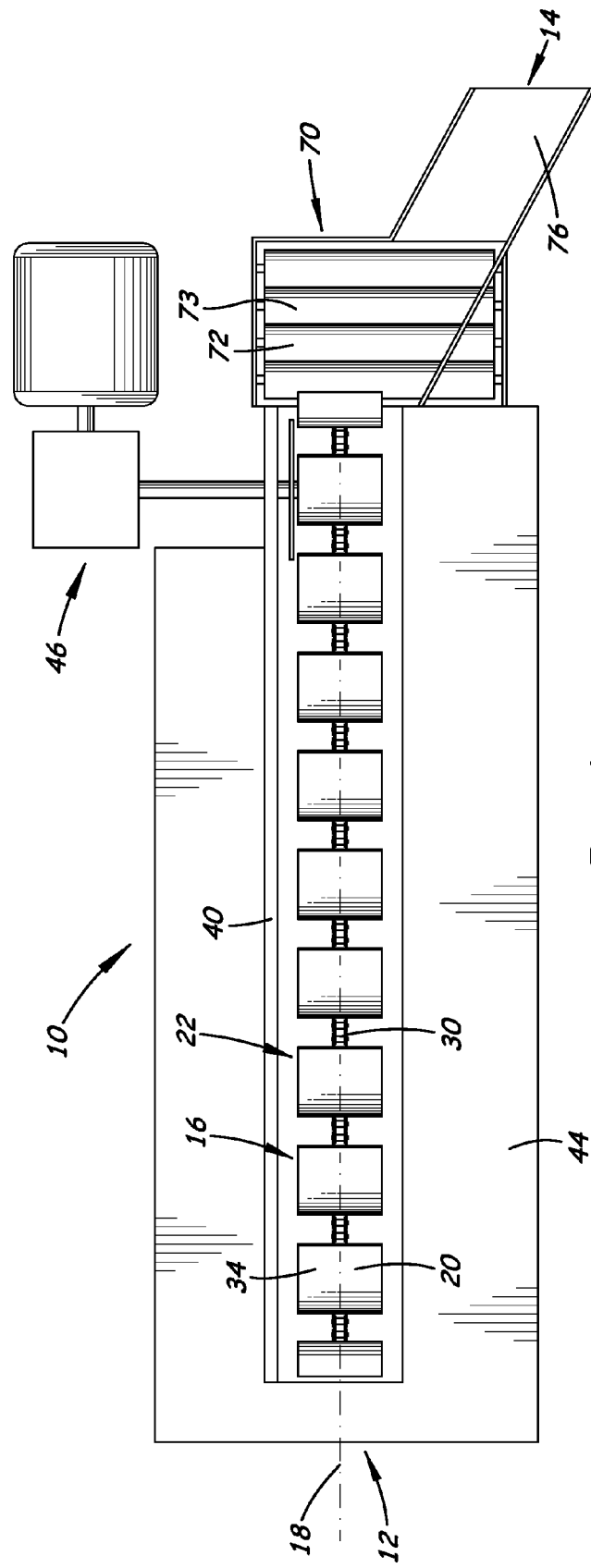
FIG. 1 is a schematic top view of a new organ processing apparatus according to the present disclosure.
Figure 2:
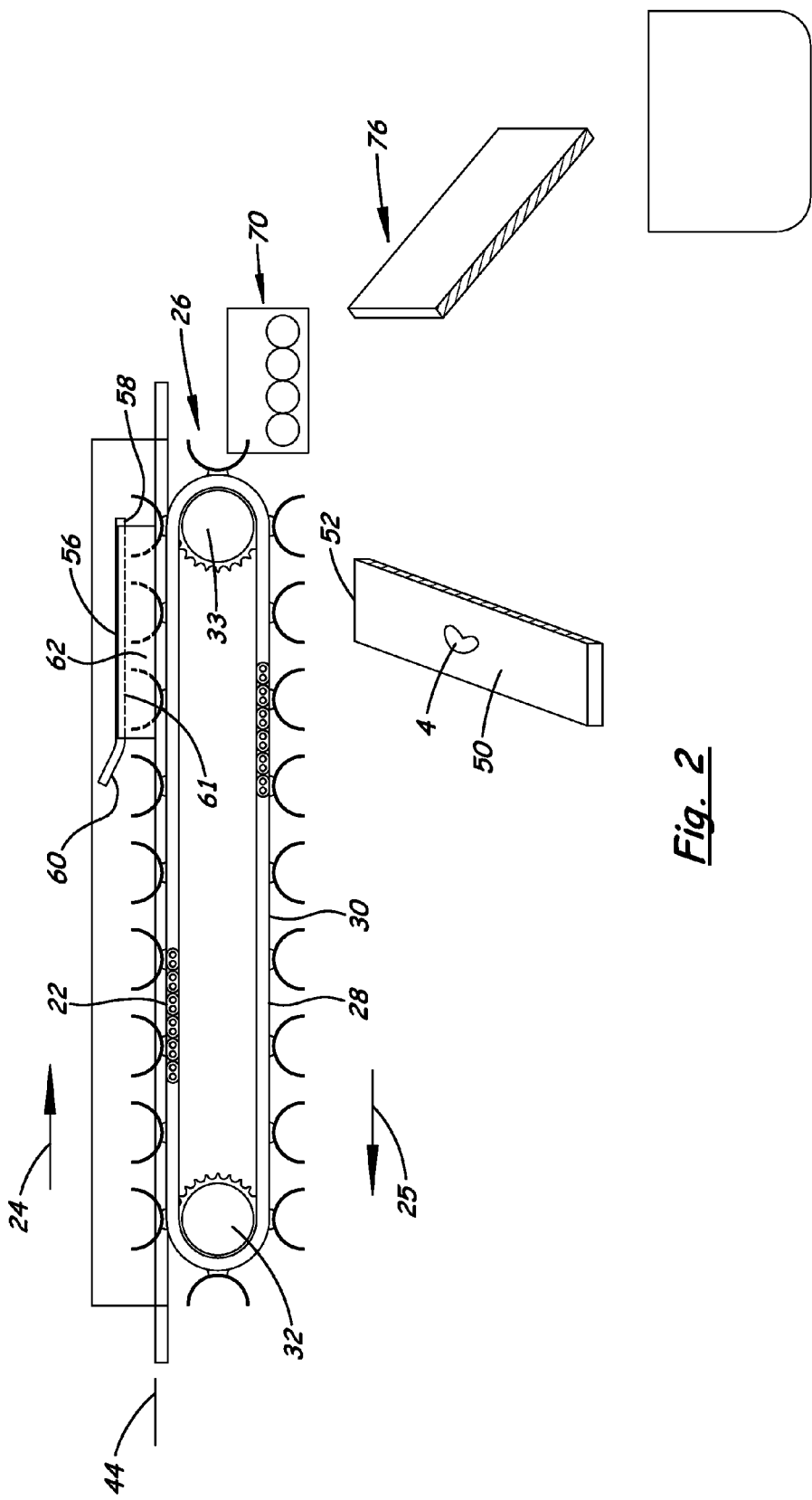
FIG. 2 is a schematic side view of the processing apparatus, according to an illustrative embodiment.
Figure 3:
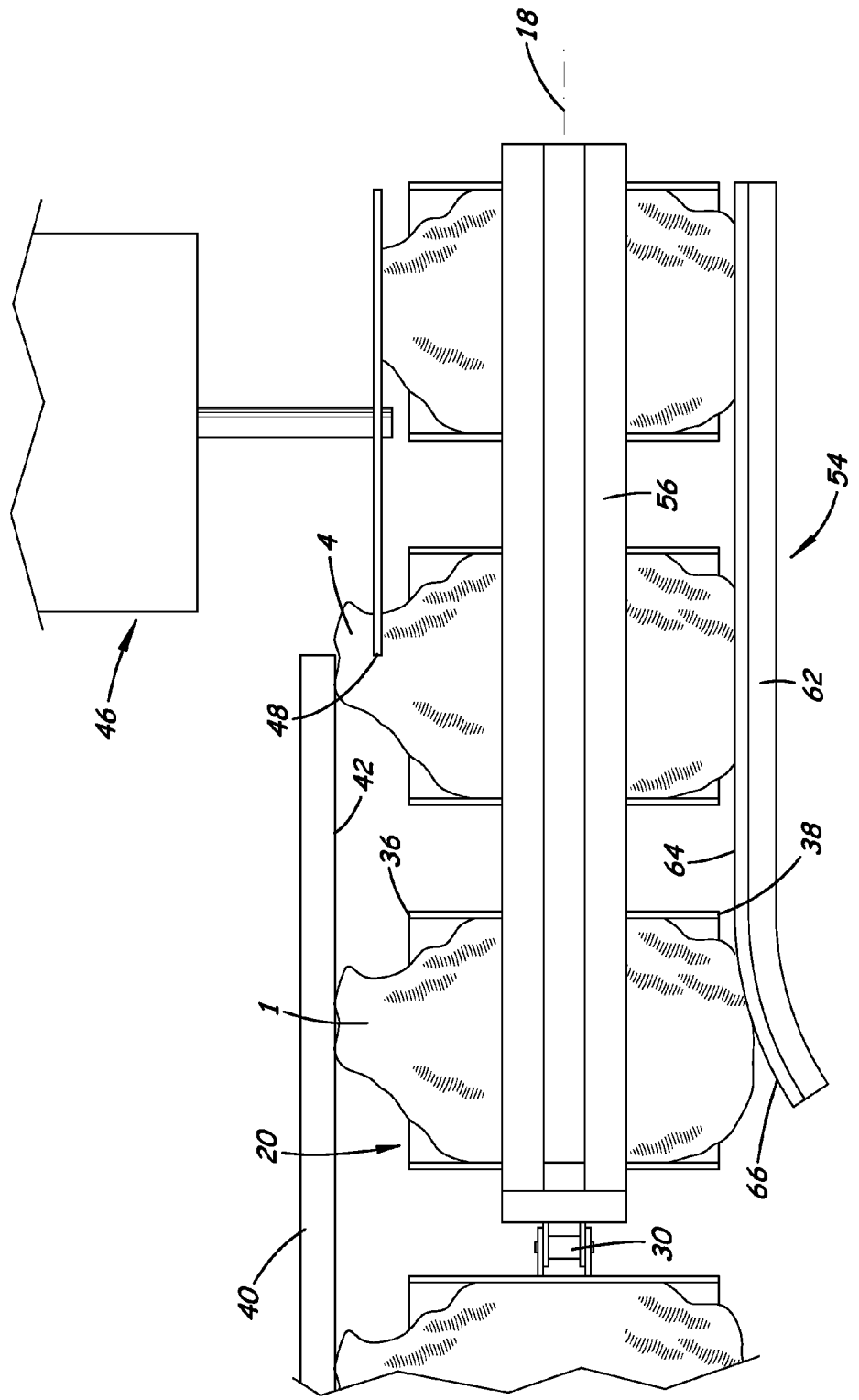
FIG. 3 is a schematic top view of a portion of the apparatus, according to an illustrative embodiment.
Figure 4:
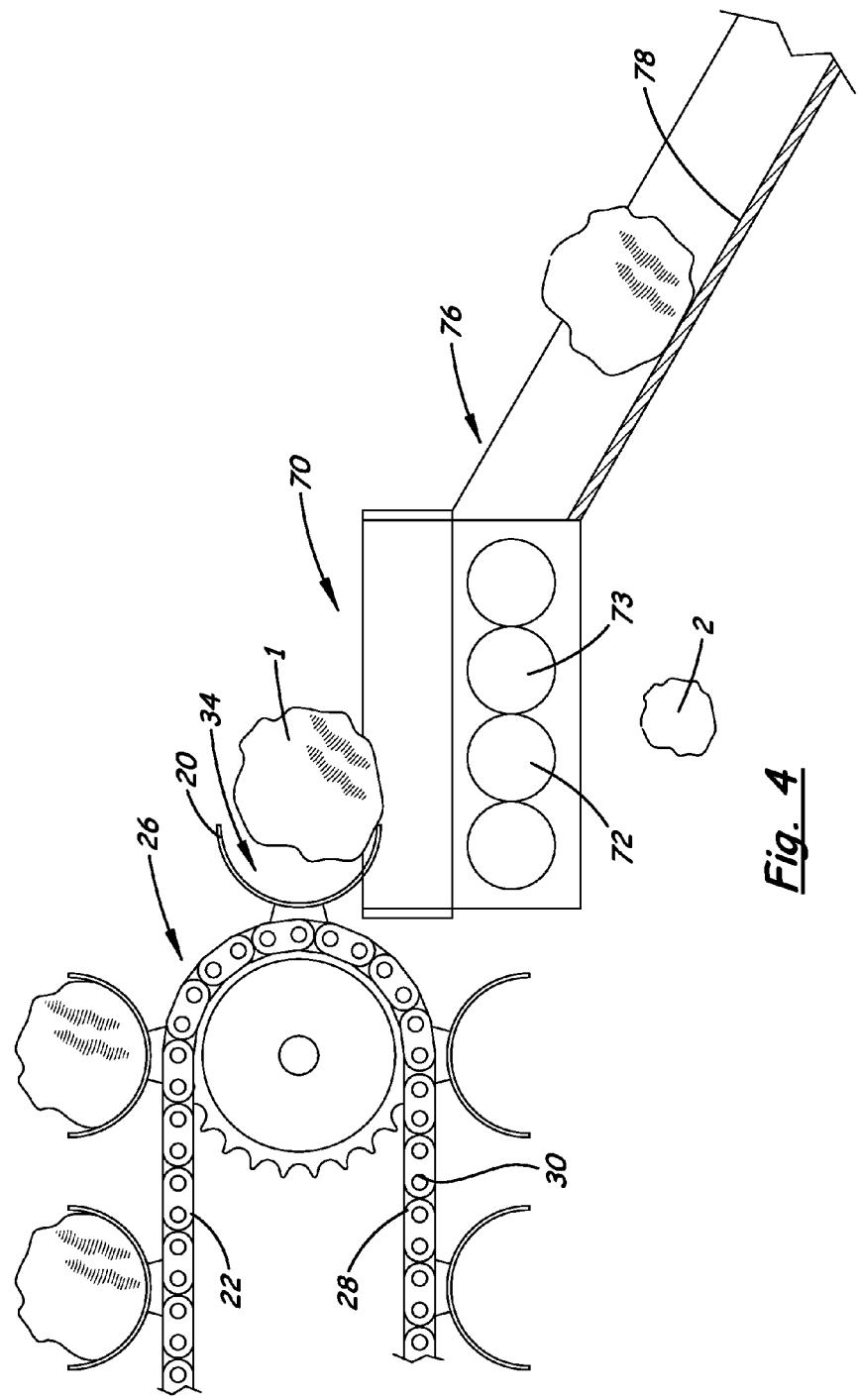
FIG. 4 is a schematic side view of a portion of the apparatus, according to an illustrative embodiment.

With reference now to the drawings, and in particular to FIGS. 1 through 4 thereof, a new livestock organ processing apparatus embodying the principles and concepts of the disclosed subject matter will be described.

The disclosure generally relates to an organ processing apparatus 10 that processes an organ of a livestock animal carcass to remove relatively less desirable or palatable or edible portions of the organ from the rest of the organ. Embodiments of the apparatus 10 may be employed to remove various vessels from the rest of the organ and to remove an encapsulating membrane from the organ. In the illustrative embodiments of the apparatus 10 described herein, an organ such as a heart may have a significant portion of the various blood vessels (e.g., veins and arteries) removed from the organ, and the pericardial sac about the heart. One highly suitable application of the apparatus 10 is for processing a turkey heart in a turkey processing plant, although it may also be suitable for use on the hearts of other livestock animals.

In general, the organ processing apparatus 10 may have an input 12 where the unprocessed organ 1 enters the apparatus 10 and an output 14 where the processed organ leaves the apparatus after being processed. In some embodiments, the unprocessed organs are loaded onto the apparatus 10 at or near the input 12, and the apparatus may fill a container for the processed organs located adjacent to the output 14.

The apparatus 10 may include an intake conveyor 16 extending from the input 12 toward the output 14, and generally having a longitudinal extent or axis 18. The intake conveyor 16 may include a plurality of cradles 20 for each receiving and carrying one of the organs to be processed. The plurality of cradles 20 are movable along the longitudinal extent 18 of the conveyor 16, and may be spaced from each other in the longitudinal direction of the conveyor. The intake conveyor 20 may have an upper extent 22 with cradles moving in a first direction 24 from the input 12 toward the output 14. The upper extent 22 of the intake conveyor may end at an unload location 26 where the cradles 20 are inverted to unload the contents (e.g., the organs) from the cradles. The intake conveyor 16 may also have a lower extent 28 which is positioned below the upper extent 22 and has cradles 20 moving in a second direction 25 opposite of the first direction and generally back towards the input.

The intake conveyor 16 may include an endless loop member 30 with cradles on the upper extent with each being oriented to receive and hold an organ and the cradles on the lower extent 28 having an inverted orientation. The endless loop member 30 may be entrained on a pair of wheels 32, 33, and in embodiments in which the endless loop member 30 comprises a chain, a first one of the wheels 32 may be being a driver sprocket and a second one of the wheels 33 may be a driven sprocket. However, other suitable structures may be utilized for the loop member 30.

The cradles 20 of the intake conveyor may define a concave interior 34 for at least partially receiving the organ to be processed. In some embodiments, the interior 30 may have a substantially semi-cylindrical shape with open lateral sides 36, 38 at opposite positions on the cradle such that portions of the organ held in the cradle may extend out of the sides 36, 38.

The apparatus 10 may also include a positioning wall 40 with a guide surface 42 located adjacent to a lateral side of the intake conveyor 16. The guide surface of the positioning wall may thus be located adjacent to the open lateral side 36 of the cradles 20 of the conveyor 16 such that organs positioned in the cradles on the upper extent of the intake conveyor may be positioned against the guide surface 42 of the positioning wall. In the illustrative embodiments, the guide surface 42 may be substantially planar, although this is not critical. The guide surface 42 may be oriented substantially parallel to the longitudinal axis 18 of the input conveyor. In many preferred embodiments of the apparatus 10, a support surface 44 may be located adjacent to the lateral side of the intake conveyor 16 at a position opposite of the positioning wall 40. The support surface 4 may be oriented substantially horizontal, and may extend along other portions of the conveyor.

A cutter 46 may be included on the apparatus 10 for the function of severing a portion of the organ from a remainder of the organ as the cradle carrying the organ is moved by the cutter. The cutter 46 may be positioned adjacent to one of the lateral sides of the cradles of the intake conveyor 16 to sever a portion 4 of the organ in the cradle away from the remainder portion as the cradles of the intake conveyor move past the cutter. The cutter 46 may have a cutting edge 48 that may be positioned in a plane that is oriented substantially parallel to the plane of the guide surface 42. The cutting edge 48 may also be offset with respect to the guide surface toward a center of the intake conveyor such that the cutting edge engages the organ as the organ is pressed against the guide surface and moves by the cutter. In the illustrative embodiments, the cutter 46 may comprising a rotating saw blade with a sharpened perimeter edge forming the cutting edge 48. In the illustrative heart organ, the severed portion of the organ comprises a majority of the vessels of the heart organ, while the remainder portion is the muscle of the heart organ, as well as an outer membrane surrounding the heart muscle. The severing of the vessels from the muscle may also open a portion of the outer membrane to facilitate subsequent removal. A discard chute 50 may be included in the apparatus 10 to receive the severed portion 4 of the organ. The discard chute 50 may have a receiving end 52 that is positioned below the cutter 46 to receive the severed portion falling away from the remainder portion of the organ.

The apparatus 10 may also include an organ holding assembly 54 that is configured to hold the organs in the respective cradles as the cradles approach the cutter 46, and hold the organs with respect to the cutter. The holding assembly 54 may be configured to hold the organs against upward movement out of the cradles, and may be configured to hold the organs against lateral movement with respect to the cradles of the intake conveyor.

The holding assembly 54 may include a first organ compression structure 56 may be configured to at least partially compress the organ downwardly into the cradle holding the organ. The first organ compression structure 56 may have a first compression surface 58 that may be positioned above a portion of the longitudinal extent 18 of the intake conveyor 16 adjacent to the cutter 46, and may extend from the cutter back along a portion of the conveyor 16 toward the input 12 of the apparatus. The first compression surface 58 may comprise a first elongated strip that extends in the longitudinal direction of the intake conveyor. In the illustrative embodiments, the first compression surface 58 may have a first section 60 and a second section 61. The first section 60 may be curved downwardly and in the first direction of the intake conveyor 16 to increase the downward pressure on the organ as the organ is moved along the longitudinal axis, and the second section 61 may be substantially horizontally oriented to maintain the pressure on the organ. The first 60 and second 61 sections may be continuous with each other.

The holding assembly 54 may also include a second organ compression structure 62 that is configured to at least partially compress the organ carried in the cradle in a lateral direction toward and against the guide surface 42. In some embodiments, even if the second organ compression structure does not compress the organ, the structure 62 resists lateral movement of the organ out of the cradle away from the cutter 46. The second organ compression structure 62 may have a second compression surface 64 that may be positioned lateral to a portion of the longitudinal extent 18 of the intake conveyor at a location adjacent to the cutter, and may extend from the cutter 46 back along a portion of the conveyor 16 toward the input 12 of the apparatus. The second compression surface 64 may be positioned laterally opposite of the guide surface 42 of the conveyor. The second compression surface 64 may comprise a second elongated strip that extends in the longitudinal direction of the intake conveyor. The second compression surface 64 may be substantially vertically oriented, and an initial section 66 of the second compression surface may be curved inwardly toward the cradles 20 of the intake conveyor to gradually increase the lateral pressure applied to the organ.

The organ processing apparatus 10 may include a peeling assembly 70 that is configured to remove the outer membrane 2 from the organ, and the assembly 70 may be positioned to remove the outer membrane after the cutter 46 has severed and removed the severed portion 4 from the organ. The peeling assembly 70 may be at least partially positioned below the unload location 26 of the intake conveyor such that organs unloading from the cradles fall into the peeling assembly. The peeling assembly 70 may comprise at least two rollers 72, 73, and in some of the most preferred embodiments includes four rollers. The rollers 72, 73 may be oriented to rotate about substantially horizontal axes, and the rollers may counter-rotate, or rotate in the opposite direction of an adjacent roller. At least a portion of the outer surface of the rollers may have a herringbone or chevron-shaped pattern of ridges and grooves, and in some embodiments the ridges and grooves of adjacent rollers will interlock with each other to some degree such that any gap between the adjacent rollers is minimal. The contact of the ridged surface of the rollers with the membrane on the exterior of the organ tends to catch and pinch the membrane between the rollers to pull the membrane away from organ.

An outlet chute 76 may be positioned adjacent to the peeling assembly 70 to receive processed organs passing from the assembly 70 after the organs have passed over the rollers and had the membrane removed. The outlet chute 76 may extend to the output 14 of the apparatus, and have an inclined surface 78 extending downwardly and outwardly from the rollers of the peeling assembly toward the output 14, and optionally a container positioned below the output.

Use of the foregoing apparatus provides safe and efficient processing of organs such as hearts after removal from the carcass, and provides additional value from the carcass that might otherwise be lost to the labor involved in manually processing the organ.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An organ processing apparatus having an input and an output, the apparatus comprising:
   an intake conveyor having a longitudinal extent extending from the input toward the output, the intake conveyor including a plurality of cradles movable along the longitudinal extent of the conveyor;
   a positioning wall with a guide surface located adjacent to a lateral side the intake conveyor;
   a cutter configured to sever a portion of an organ positioned in one of the cradles from a remainder of the organ; and
   an organ holding assembly configured to hold an organ from moving out of at least one of the cradles as the at least one cradle moves by the cutter.

2. The apparatus of claim 1 additionally comprising a peeling assembly configured to remove an outer membrane from the organ; and
   wherein the peeling assembly is positioned to remove the outer membrane from the organ after the cutter has severed the severed portion of the organ.

3. The apparatus of claim 1 additionally comprising a peeling assembly configured to remove an outer membrane from the organ; and
   wherein the peeling assembly comprises at least two rollers positioned adjacent to each other, at least a portion of an outer surface of the rollers having alternating ridges and grooves configured to pull the outer membrane from the organ.

4. The apparatus of claim 3 wherein the ridges and grooves of the at least two rollers interlock together.

5. The apparatus of claim 1 wherein the cutter is positioned adjacent to one of the lateral sides of the intake conveyor to sever a portion of an organ protruding from an open lateral side of a said cradle as the cradles of the intake conveyor move past the cutter.

6. The apparatus of claim 1 additionally comprising a discard chute configured to receive the severed portion of the organ, the discard chute having a receiving end positioned below the cutter.

7. The apparatus of claim 1 additionally comprising an outlet chute extending from the peeling assembly to the output of the apparatus, the outlet chute having an inclined surface extending downwardly and outwardly from the rollers of the peeling assembly.

8. The apparatus of claim 1 additionally comprising a support surface located adjacent to a lateral side of the intake conveyor opposite of the positioning wall.

9. The apparatus of claim 1 wherein the guide surface of the positioning wall is located adjacent to an open lateral side of the cradles of the intake conveyor such that organs positioned in the cradles on an upper extent of the intake conveyor are positionable against the guide surface.

10. The apparatus of claim 1 wherein each of the cradles define a concave interior having a lowermost extent approximately midway between side surfaces for centering an organ in the interior.

11. The apparatus of claim 1 wherein each of the cradles has a pair of opposite open lateral sides and side wall portions extending between the lateral sides, the side wall portions having lower sections sloping downwardly and inwardly together to form a bottom that has a lowest extent approximately midway between upper sections of the side wall portions for centering an organ in an interior of the cradle.

12. The apparatus of claim 1 wherein the intake conveyor includes an endless loop member with an upper extent with cradles moving in a first direction from the input toward the output, the upper extent of the intake conveyor terminating at an unload location where the cradles are inverted to unload contents of the cradles into the peeling assembly.

13. The apparatus of claim 1 wherein the holding assembly is configured to resist upward movement out of the cradles.

14. The apparatus of claim 1 wherein the holding assembly is configured to hold the organs against lateral movement of the organs with respect to the intake conveyor.

15. The apparatus of claim 1 wherein the holding assembly defines a compression surface positioned opposite of the cutter with at least one of said cradles positioned therebetween such that the compression surface resists movement of the organ away from the cutter.

16. The apparatus of claim 1 wherein the cutter is positioned relative to the positioning wall to cut in a plane located between a plane of the guide surface of the positioning wall and the cradles of the intake conveyor.

17. An organ processing apparatus having an input and an output, the apparatus comprising:
- an intake conveyor having a longitudinal extent extending from the input toward the output, the intake conveyor including a plurality of cradles movable along the longitudinal extent of the conveyor;
- a positioning wall with a guide surface located adjacent to a lateral side the intake conveyor;
- a cutter configured to sever a portion of an organ positioned in one of the cradles from a remainder of the organ;
- a peeling assembly configured to remove an outer membrane from the organ; and
- an organ holding assembly configured to hold the organs in the respective cradles with respect to the cutter.

18. The apparatus of claim 17 wherein the holding assembly is configured to hold the organs against upward movement out of the cradles.

19. The apparatus of claim 18 wherein the holding assembly includes a first organ compression structure configured to at least partially compress the organ downwardly into the cradle holding the organ.

20. The apparatus of claim 17 wherein the holding assembly is configured to hold the organs against lateral movement with respect to the intake conveyor.

21. The apparatus of claim 20 wherein the holding assembly includes a second organ compression structure configured to at least partially compress the organ carried in the cradle laterally against the guide surface of the positioning wall.

22. An organ processing apparatus having an input and an output, the apparatus comprising:
- an intake conveyor having a longitudinal extent extending from the input toward the output, the intake conveyor including a plurality of cradles movable along the longitudinal extent of the conveyor, the cradles having an open lateral side;
- a positioning wall with a guide surface located adjacent to the open lateral sides of the cradles on a lateral side the intake conveyor such that the organ in a said cradle is able to slide along the guide surface;
- an organ holding assembly configured to hold the organs in the respective interiors of the cradles and hold the organs in the cradles against the guide surface;
- a cutter configured to sever a portion of an organ positioned in one of the cradles and moving along the guide surface such that a remainder portion of the organ remains in the cradle as the organ moves by the cutter.

\* \* \* \* \*